United States Patent
Jeon et al.

(10) Patent No.: US 10,604,894 B2
(45) Date of Patent: Mar. 31, 2020

(54) METHOD OF REDUCING WASTE SLUDGE USING ACID TREATMENT AND METHOD OF CARBONATING CARBON DIOXIDE WITH HIGH PURITY USING PAPER MILL WASTE SLUDGE

(71) Applicant: Korea Institute Of Geoscience And Mineral Resources, Daejeon (KR)

(72) Inventors: Chi-Wan Jeon, Daejeon (KR);
Sang-Won Park, Daejeon (KR);
Jun-Hwan Bang, Daejeon (KR);
Kyung-Sun Song, Daejeon (KR);
Seung-Woo Lee, Daejeon (KR);
Hwan-Ju Jo, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 257 days.

(21) Appl. No.: 15/808,125

(22) Filed: Nov. 9, 2017

(65) Prior Publication Data

US 2018/0258587 A1 Sep. 13, 2018

(30) Foreign Application Priority Data

Mar. 7, 2017 (KR) .................. 10-2017-0028983
Mar. 29, 2017 (KR) .................. 10-2017-0039754
Apr. 13, 2017 (KR) .................. 10-2017-0047778

(51) Int. Cl.
  *D21C 11/00* (2006.01)
  *D21H 17/70* (2006.01)
(52) U.S. Cl.
  CPC ......... *D21C 11/0007* (2013.01); *D21H 17/70* (2013.01); *Y02P 40/44* (2015.11)

(58) Field of Classification Search
None
See application file for complete search history.

(56) References Cited

U.S. PATENT DOCUMENTS 5,013,454 A * 5/1991 Hynninen ............... C02F 1/286
  162/29
2002/0148574 A1* 10/2002 Van Draanen .......... C13K 1/02
  162/14

FOREIGN PATENT DOCUMENTS

JP 2003-095765 A 4/2003
JP 2003-145092 A 5/2003
(Continued)

OTHER PUBLICATIONS

KR 20160096512 Machine Translation—Kim, Da Mi et al—Aug. 16, 2016 (Year: 2016).*

(Continued)

*Primary Examiner* — Bradley R Spies
(74) *Attorney, Agent, or Firm* — Harness, Dickey & Pierce, P.L.C.

(57) ABSTRACT

The present invention provides a method of carbonating carbon dioxide with high purity using a paper mill waste sludge by preparing a paper mill waste sludge which is a waste product discharged during the production of paper-making, adding acid to the paper mill waste sludge and reacting the acid therewith to produce a mixed solution and stirring, separating a supernatant of the mixed solution into an eluate, adding a basic substance to the eluate and adjusting pH to precipitate some of the ions in the eluate, and then adding a reaction initiator to the eluate in which some ions are precipitated and removed, and injecting carbon dioxide for a carbonation reaction.

13 Claims, 9 Drawing Sheets

(56) References Cited

FOREIGN PATENT DOCUMENTS

| | | |
|---|---|---|
| JP | 2009-195791 A | 9/2009 |
| KR | 10-2009-0078702 A | 7/2009 |
| KR | 10-2011-0053716 A | 5/2011 |
| KR | 10-1118758 B1 | 3/2012 |
| KR | 10-2013-0064896 A | 6/2013 |
| KR | 10-1312809 B1 | 9/2013 |
| KR | 10-2016-0096512 A | 8/2016 |

OTHER PUBLICATIONS

Lee, Seungu, Chae, Sucheon, Jeon, Chiwan et al. Oct. 22, 2016, Study on Mineral Carbonation of Alkaline Industrial Products, GP2015-009-2015(1).

Notice of Allowance for corresponding Korean Application No. 10-2017-0028983 dated Feb. 27, 2018.

\* cited by examiner

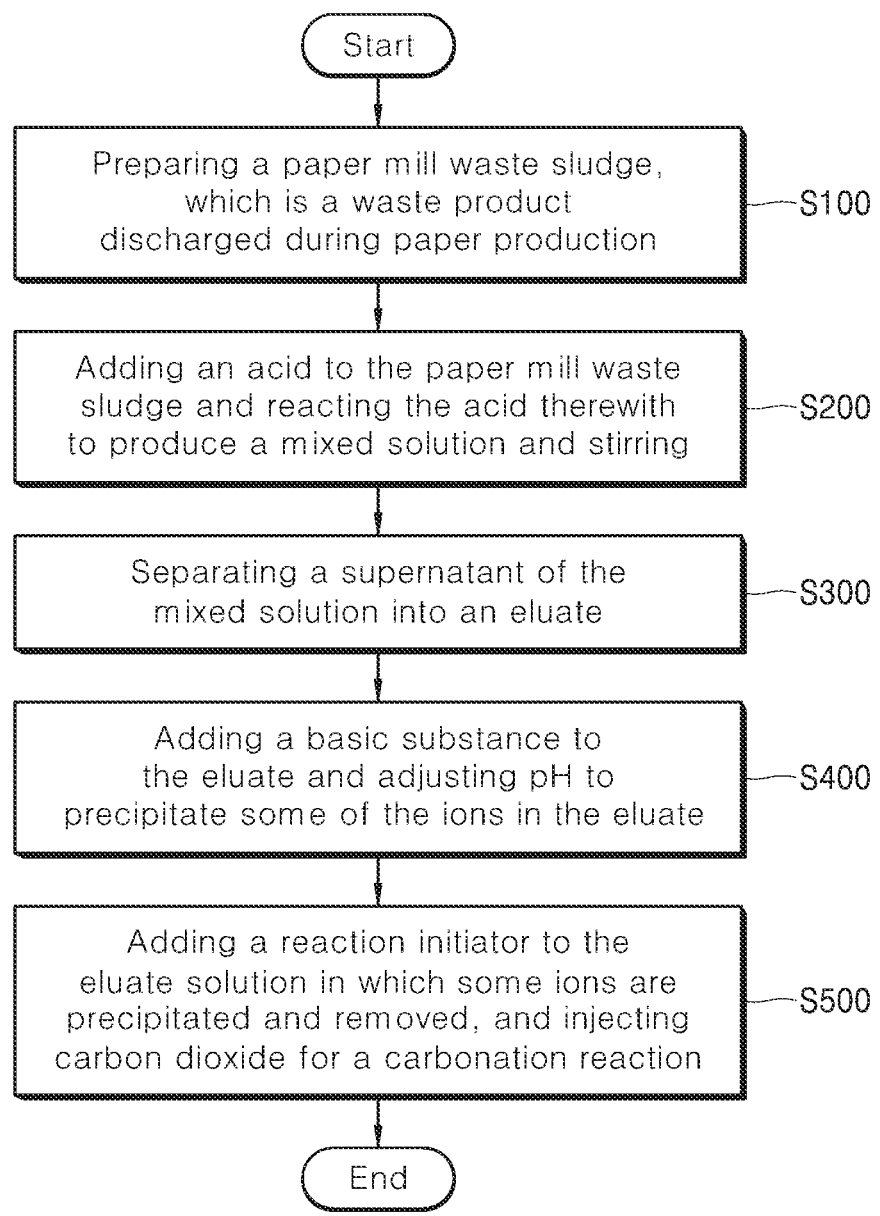

[Fig. 3]
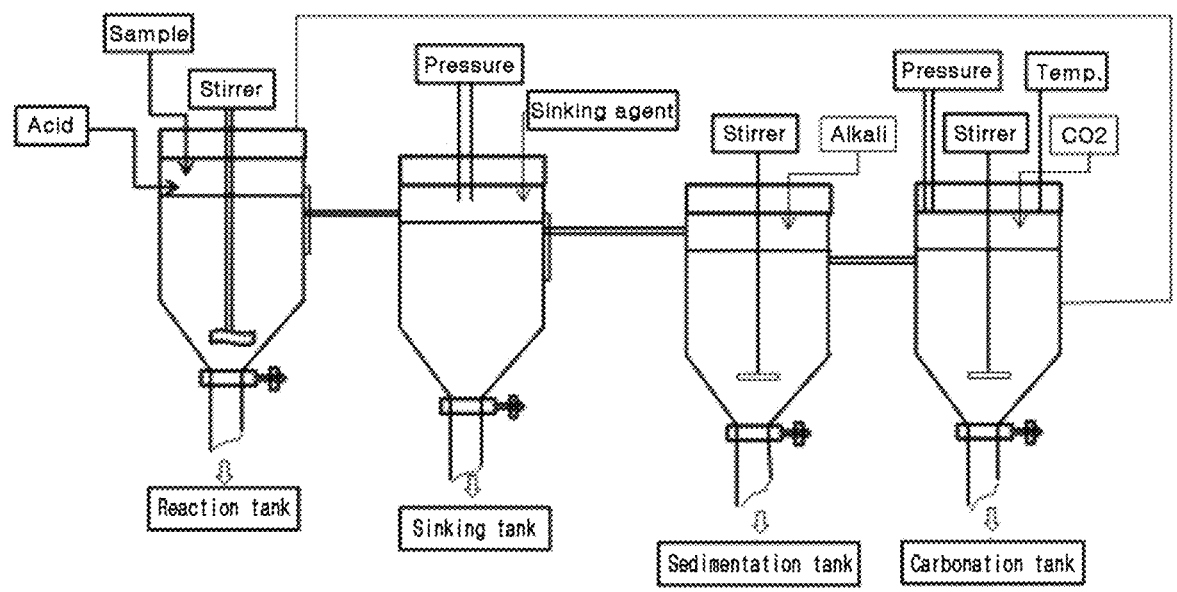
[Fig. 6A]
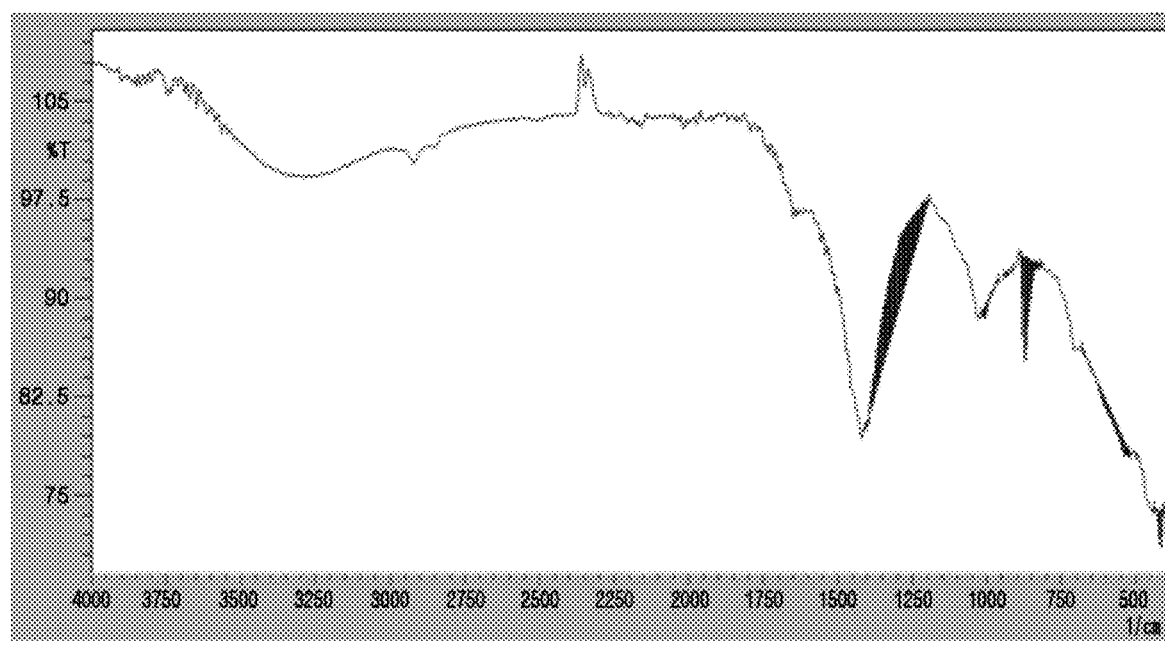

[Fig. 6B]
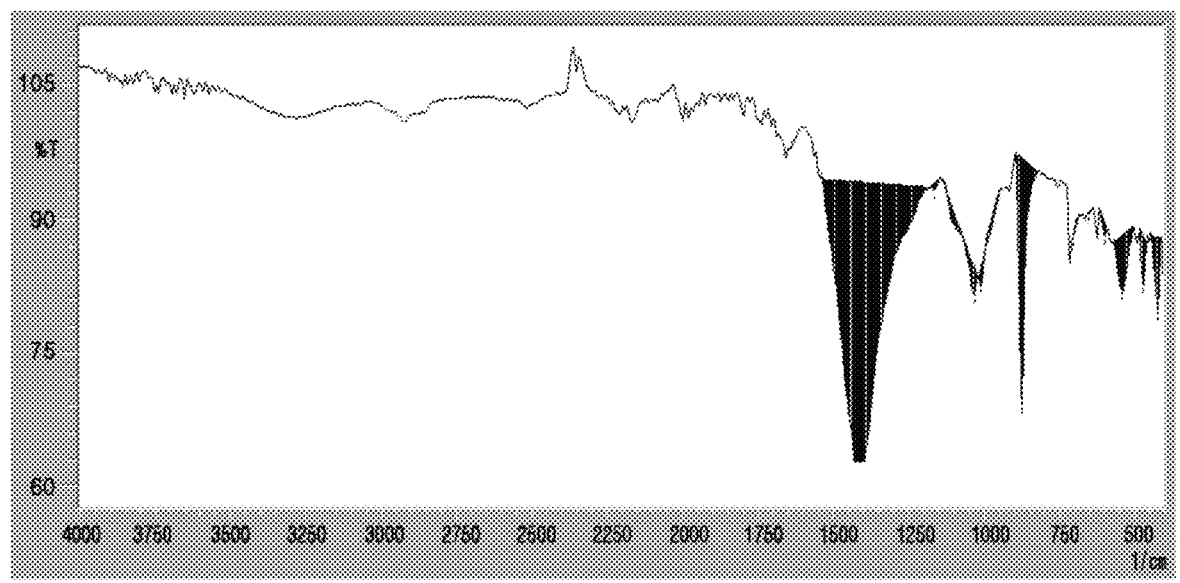
[Fig. 6C]
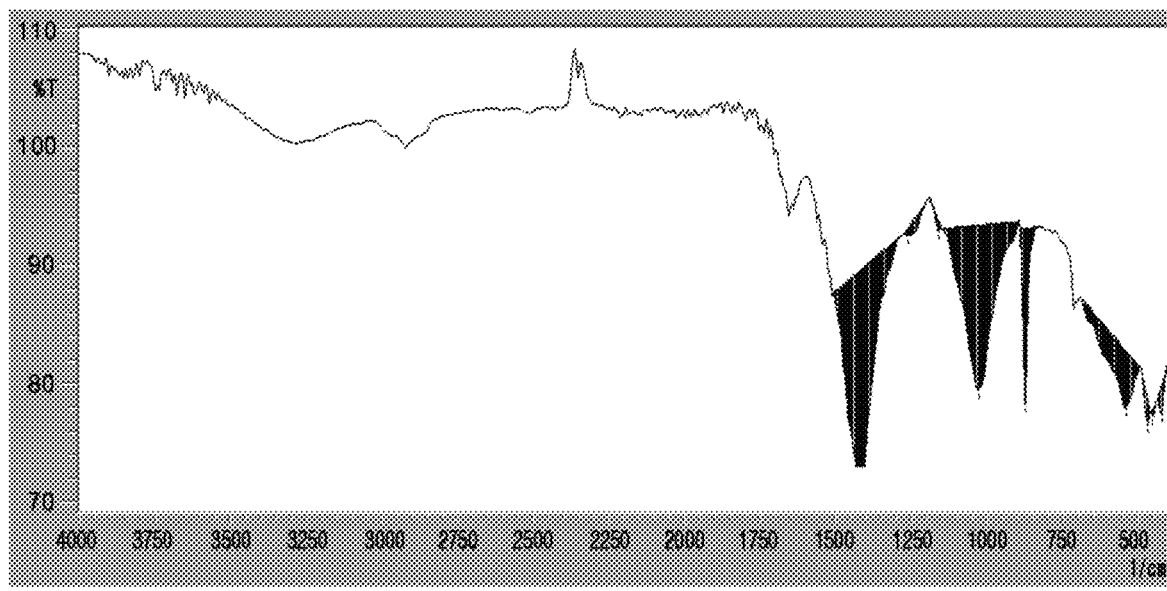

[Fig. 6D]
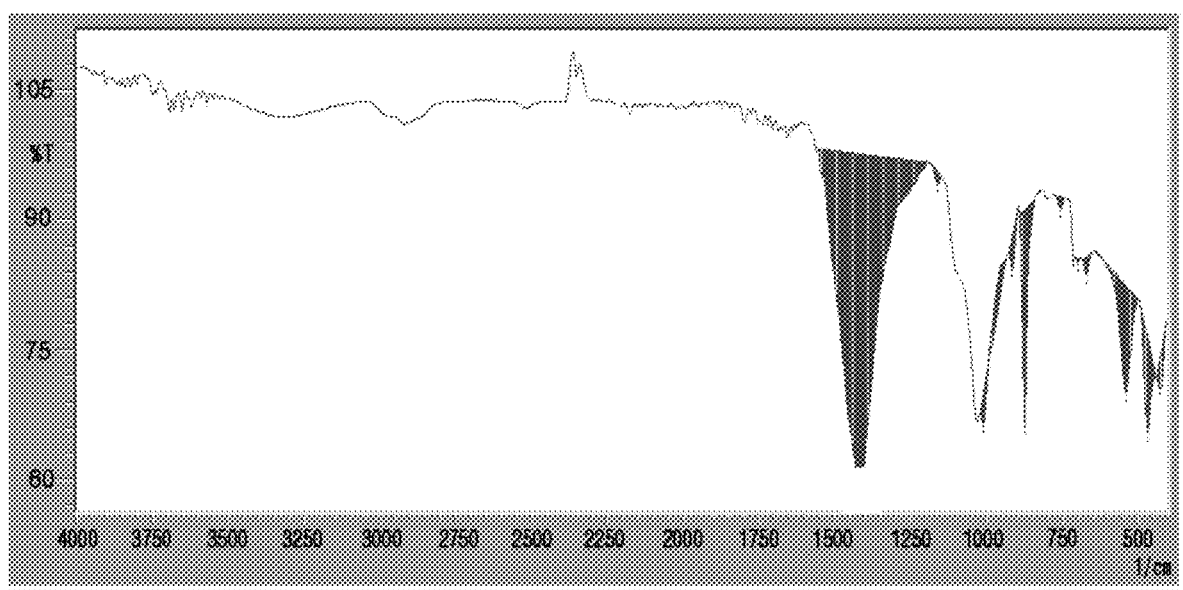

METHOD OF REDUCING WASTE SLUDGE USING ACID TREATMENT AND METHOD OF CARBONATING CARBON DIOXIDE WITH HIGH PURITY USING PAPER MILL WASTE SLUDGE

CROSS-REFERENCE TO RELATED APPLICATION

This application claims priority to Korean Patent Application No. 10-2017-0028983 filed on Mar. 7, 2017, Korean Patent Application No. 10-2017-0039754 filed on Mar. 29, 2017, Korean Patent Application No. 10-2017-0047778 filed on Apr. 13, 2017, and all the benefits accruing therefrom under 35 U.S.C. § 119, the contents of which are incorporated by reference in its entirety.

BACKGROUND OF THE INVENTION

1. Field of the Invention

The present disclosure relates to a method for reducing waste sludge which is exceedingly harmful to the environment as a byproduct of the paper industry, and a method for reducing alkaline paper mill waste sludge in the waste sludge, reducing carbon dioxide using paper mill waste sludge capable of stably carbonating, fixing carbon dioxide to a high purity carbonation process.

2. Description of the Related Art

Korea's paper production volume is about 11.8 million tons per year as of 2013, and is the 5th largest paper producer country in the world after China, USA, Japan and Germany, and produces about 500,000 tons of pulp annually, ranking 26th in the world (Statistical Yearbook of the Korean Paper Association, 2013). Although the domestic paper industry accounts for only 0.71% of the total domestic manufacturing industry in 2013, the adverse effects of carbon dioxide, wastewater and sludge on the production process of paper or pulp production processes are immense. As the next step in the dyeing industry, the domestic paper industry is an industry with great environmental risks, and it is expected that the amount of these pollutants will continue to increase with the increase of production due to continuous consumption of paper, which may lead to serious environmental problems.

For the preparation of cellulose pulp, wood chips or herbs are placed in a digester, and sodium hydroxide (NaOH) and sodium sulfide (Na 2 S) are added at a high concentration and heated at 170° C. for 2 to 4 hours. This process facilitates dissolution of the lignin and separation of the recovered cellulose fibers. Most of the black residual liquid from the dissolution of lignin is converted into white residual liquid and circulated to the pyrolysis furnace. This conversion process is followed by a burning process in the boiler and an alkalinizing process using quicklime. As a result, because alkaline solid waste rich in portlandite is produced, paper mill waste sludge is generally referred to as alkaline paper mill waste. Most of the pulp or paper mill waste sludge produced through this treatment process contains cellulose, lignin, hemicellulose, calcium carbonate, clay or other inorganic materials.

Paper mill waste sludge can be used as a cement raw material because it is rich in portlandite, or it can be used as an alkali improving agent for agricultural land, but it contains chlorine ions and heavy metals, and recycling is strictly limited.

Most of the paper mill waste sludge is processed mostly by marine reclamation, land reclamation, or calcification. However, recently, ocean disposal of paper mill waste sludge was prohibited and land filling or incineration has to be done since paper mill waste sludge has a very high water content of more than 75%, calcification through incineration is exceptionally difficult.

Accordingly, it is urgent to develop a method of carbonating carbon dioxide by using alkaline calcium in the elute, and make paper sludge lighter for the landfill or calcification treatment of paper mill waste sludge, or make the paper sludge lighter for discharging.

As a relative prior art, there is a method of decomposing carbon dioxide using paper mill waste sludge disclosed in Korean Granted Patent No. 10-1118758 (published on Mar. 13, 2012).

SUMMARY OF THE INVENTION

The present disclosure is directed to providing a method of, reducing waste sludge, which is a waste product that is harmful to the environment and is expensive to process, to reduce environmental harm, reducing the amount of paper mill waste sludge in waste sludge to increase the efficiency of the paper mill waste sludge treatment process, and carbonating carbon dioxide to have a high purity by using an eluate produced during the treatment of paper mill waste sludge, for an effect of reducing carbon dioxide and highly purifying calcium carbonate.

The details of other embodiments are included in the detailed description of the invention' and the accompanying drawings.

In order to solve the above-mentioned problems, one aspect of the present invention provides a method of reducing waste sludge using acid treatment that comprises, (i) preparing waste sludge; (ii) adding an acid to the waste sludge to produce a mixed solution and stirring; and (iii) separating a supernatant from the mixed solution into an eluate.

The waste sludge may be a pulp sludge, a paper mill waste sludge, or a mixture thereof and the mixture may be a mixture of pulp sludge and paper mill waste sludge at a weight ratio of (8~9):(2~1).

The pulp sludge may contain iron ions, and the paper mill waste sludge may contain calcium ions.

The acid may be any one selected from a group consisting of nitric acid, hydrochloric acid, sulfuric acid, and acetic acid, and the acid may be a concentration of 1 to 5 N.

According to another aspect of the present invention, there is provided a method of carbonating carbon dioxide with high purity using a paper mill waste sludge comprises the steps of: (a) preparing a paper mill waste sludge, which is a waste product discharged during papermaking; (b) adding acid to the paper mill waste sludge and reacting the acid therewith to produce and stirring; (c) separating a supernatant of the mixed solution into an eluate; (d) adding a basic substance to the eluate and adjusting pH to precipitate some of the ions in the eluate; and (e) adding a reaction initiator to the eluate in which some ions have been precipitated and removed, and injecting carbon dioxide for a carbonation reaction.

Also, the paper mill waste sludge may contain a large amount of calcium ions and further comprises one or more ions selected from a group consisting of iron, aluminum, and silicon, as a carbonation-inhibiting ion.

Also, in the step of preparing the paper mill waste sludge, the paper mill waste sludge may be dried in air, and then pulverized to be grain-refined.

Also, the acid may be any one selected from a group consisting of nitric acid, hydrochloric acid, sulfuric acid, and acetic acid.

Also, the acid may be a concentration of 1 to 5 N.

Also, in the step of adding acid to the paper mill waste sludge, 1.0 to 1.5 equivalents of an acid is added to the total ion equivalent weight of the paper mill waste sludge.

Also, in the step of the stirring step, the mixture is stirred at 200 to 300 RPM using a stirrer.

Also, in the step of separating the eluate from a supernatant of the mixed solution, the mixed solution may be filtrated and then pressured, or precipitating agent may be added to precipitate the colloidal fine particles.

Also, the basic substance may also be caustic soda (NaOH).

Also, a basic substance may be added to the eluate to change the pH to a range of 11.5 to 12.5.

Also, in the step of precipitating some of the ions, iron, aluminum or silicon ions which are carbonation-inhibiting ions in the eluate, may be precipitated.

Also, the reaction initiator may be a neutral alkylamine, and is any one selected from a group consisting of methylamine, dimethylamine, isopropylamine, and cyclohexylamine.

Also, in the step of injecting carbon dioxide for a carbonation reaction, the eluate may be aerated with carbon dioxide, or the carbon dioxide may be injected at a pressure of 20 to 30 bar in a high pressure reactor into the paper mill waste sludge.

Also, it may be further comprising recovering an amine through dialysis, after the carbonation reaction.

According to the present invention, it is possible to reduce the waste sludge, which is an environmental hazard waste generated in pulp or papermaking production process, by 80% or more, thereby greatly reducing the environmental risk of the papermaking production process.

Also, paper mill waste sludge among the waste sludge may be reduced to produce an eluate, which may be carbonated at a high purity by reacting with carbon dioxide generated during the papermaking process, thereby changing the papermaking production process into an environmentally friendly process.

Also, the calorific value of the residual solids generated after the paper mill waste sludge reduction is increased, so that the energy of the residual solids can be recovered.

Also, paper mill waste sludge can be separated into residual solids and the eluate, and carbon dioxide that can be generated during paper production can be carbonated by using ions in the eluate to reduce carbon dioxide and produce calcium carbonate.

Also, the pH of the eluate can be adjusted to produce high purity calcium carbonate, which greatly increases the value of the process by-products.

BRIEF DESCRIPTION OF THE DRAWINGS

FIG. 2 is a process flow diagram illustrating a method of high purity carbonation of carbon dioxide using paper mill waste sludge according to another embodiment of the present invention.

FIG. 3 is a conceptual diagram illustrating a system for high-purity carbonation of carbon dioxide using paper mill waste sludge according to another embodiment of the present invention.

FIG. 6a is a graph showing Fourier transform analysis results according to a raw sample (sample 1) in a high purity carbonation method of carbon dioxide using paper mill waste sludge according to another embodiment of the present invention.

FIG. 6b is a graph showing Fourier transform analysis results according to a raw sample (sample 2) in a high purity carbonation method of carbon dioxide using paper mill waste sludge according to another embodiment of the present invention.

FIG. 6c is a graph showing Fourier transform analysis results according to a raw sample (sample 3) in a high purity carbonation method of carbon dioxide using paper mill waste sludge according to another embodiment of the present invention.

FIG. 6d is a graph showing Fourier transform analysis results according to a raw sample (sample 4) in a high purity carbonation method of carbon dioxide using paper mill waste sludge according to another embodiment of the present invention.

DETAILED DESCRIPTION OF THE INVENTION

Hereinafter, an exemplary embodiment of the present invention will be described in detail with reference to accompanying drawings.

The advantages and/or features of the present invention and the manner of achieving them will become apparent by reference to various embodiments described in detail below with reference to the accompanying drawings.

However, the present invention is not limited to the configurations of the embodiments described below, but may be embodied in various other forms, and each embodiment disclosed in this specification is intended to be illustrative only, and it will be understood by those of ordinary skill in the art that various changes in form and details may be made therein without departing from the spirit and scope of the invention as defined by the appended claims.

Also, in the following description of the present invention, a detailed description of a configuration that is considered to unnecessarily obscure the gist of the present invention, for example, a known technology including the prior art, may be omitted.

According to an aspect of the present invention, there is provided a method of reducing waste sludge using acid treatment comprises the steps of: (i) preparing a waste sludge; (ii) adding an acid to the waste sludge to produce and stir a mixed solution; and (iii) separating a supernatant from the mixed solution into an eluate.

Figure 1:
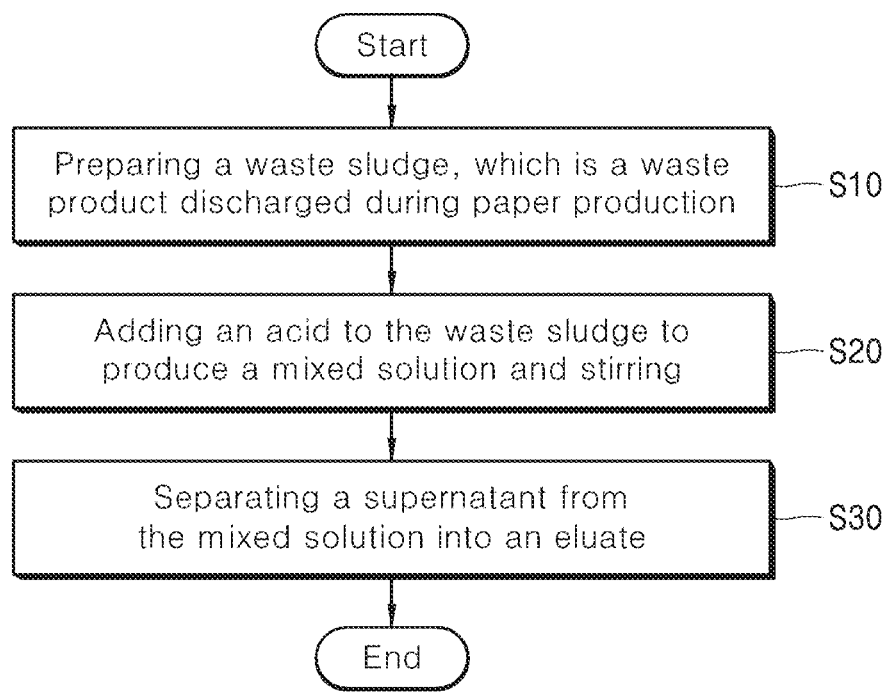
FIG. 1 is a process flow diagram illustrating a method for reducing waste sludge through acid decomposition according to an embodiment of the present invention.

FIG. 1 is a process flow diagram illustrating a method for reducing waste sludge through acid decomposition according to an embodiment of the present invention.

Referring to FIG. 1, waste sludge, which is a waste product discharged during papermaking, is prepared in step S10.

The waste sludge may be a pulp sludge discharged from a paper making sludge produced in a papermaking production process or a pulp production process.

The waste sludge may be a mixture of a paper mill waste sludge or pulp sludge.

The paper mill waste sludge may be generated in a papermaking process that processes the pulp to produce wood-free paper, and the pulp sludge may be a by-product of the pulp production process.

The mixture may be a mixture of pulp sludge and paper mill waste sludge in a weight ratio of 8~9:2~1, but is not limited thereto, and is discharged at the above-mentioned ratio when the wood-free paper is consistently produced from pulp.

Therefore, if the process for producing paper or pulp is changed, the mixing ratio of the pulp sludge and the paper mill waste sludge may be changed. In this case, however, the effect of reduction by the acid treatment described below is reduced, there may arise a problem that the effect of reducing the sulfuric acid treatment on iron is particularly reduced.

The pulp sludge contains iron ions, and the paper mill waste sludge may contain calcium ions.

In particular, paper mill waste sludge uses lime (CaO) to separate lignin and cellulose from the paper manufacturing process and reuses the filtrate, which can produce alkaline calcium-rich paper mill waste sludge.

The pulp sludge may contain calcium, magnesium and aluminum in addition to iron ion. However, when iron ion containing a large amount of pulp sludge is extracted by acid treatment, the effect of weight reduction can be further increased, and the discharged eluate can be used for the carbonation of carbon dioxide.

The paper mill waste sludge may contain iron, magnesium, and aluminum in addition to calcium ions, and extraction efficiency varies depending on the kind of acid corresponding to the ion species. At this time, the eluate may be used for the carbonation process after the weight reduction, and it is preferable to selectively use acid in the acidification treatment process of the paper mill waste sludge.

The acid may be any one selected from a group consisting of nitric acid, hydrochloric acid, sulfuric acid, and acetic acid.

The acid decomposes the waste sludge to form a colloid, so that ions contained in the waste sludge can be eluted into the eluate.

The efficiency of the waste sludge reduction method may be changed by varying the extraction efficiency depending on the type of acid contained in the paper mill waste sludge and pulp sludge and the type of acid in the acid treatment process may be selected depending on the ion species in the waste sludge.

In this case, it is highly desirable to use hydrochloric acid when considering efficacy depending on the type of acid, considering that the eluate is used in the carbonation process by reacting the eluate with carbon dioxide after the step of reducing waste sludge. The acid having a concentration of 1 to 5 N can be used.

When the concentration of the acid is out of the above range, it is difficult to control to an appropriate equivalent amount when reacting with ions in the waste sludge.

The waste sludge is prepared in step S10, and acid is added to the waste sludge to produce a mixed solution and stirred in S20.

The amount of acid added to the waste sludge may be 1.0 to 1.5 equivalents based on the ionic equivalent. If the amount is outside the above range, an unnecessary acid is added to increase the treatment cost or the extraction efficiency of ions in the waste sludge is reduced. There is a problem that the effect of reducing the waste sludge is reduced.

On the other hand, in the step of preparing the waste sludge (first step), the waste sludge can be dried and pulverized in air to be grain-refined.

If the waste sludge is not dried and pulverized, the reactivity with acid is reduced during the acid treatment, so that the contained ions may not be extracted sufficiently.

The stirring step may be performed at 200 to 300 RPM using a stirrer.

In the case of stirring in the above range, the waste sludge-containing ions may be extracted by reacting with the acid to increase the extraction efficiency.

The eluate may be separated from the mixed solution in step S30.

When the eluate is separated, residual solids are left.

At this time, the eluate contains calcium ions, which can be used in the carbonation process of carbon dioxide, and the remaining solid matter is reduced by 80% or more with respect to the total weight of the waste sludge, thereby greatly increasing the efficiency of the waste sludge treatment process.

The remaining solids separated from the eluate exhibition of high heat content and can be utilized as a new energy source.

Therefore, the method of reducing waste sludge through acid decomposition according to the present invention can be processed by reducing the waste sludge, which is a waste product discharged during the production of papermaking or pulp production, to be treated.

According to another aspect of the present invention, there is provided a method of carbonating carbon dioxide with high purity using a paper mill waste sludge, comprising the steps of: (a) preparing a paper mill waste sludge, which is a waste product discharged during papermaking; (b) adding an acid to the paper mill waste sludge and reacting the acid therewith to produce a mixed solution and stirring; (c) separating a supernatant of the mixed solution into an eluate; (d) adding a basic substance to the eluate adjusting pH to precipitate some of the ions in the eluate; and (e) adding a reaction initiator to the eluate in which some ions have been precipitated and removed, and injecting carbon dioxide for a carbonation reaction.

FIG. 2 is a process flow diagram illustrating a paper mill waste sludge method of carbonating carbon dioxide with high purity using paper mill waste sludge according to another embodiment of the present invention.

Referring to FIG. 2, the paper mill waste may be generated in a papermaking process for producing a paper sheet by processing pulp.

The paper mill waste sludge is a waste product discharged during papermaking.

The paper mill waste sludge contains a large amount of calcium ions and may contain one or more ions selected from a group consisting of iron, aluminum and silicon as a carbonation-inhibiting ion.

The paper mill waste sludge separates lignin and cellulose in the papermaking process and uses calcium lime (CaO) to reuse the filtered liquid, and calcium-rich alkaline paper mill waste sludge is produced.

The calcium-rich alkaline paper mill waste sludge is capable of carbonating mineral to capture carbon dioxide, and can be carbonated using carbon dioxide generated in the papermaking production process.

Alkalin-based solid wastes rich in portlandite can be produced by the alkalinizing process using the quicklime.

The portlandite can be carbonated by the following Reaction Formula 1.

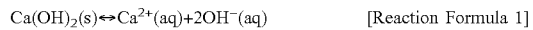

$$Ca(OH)_2(s) \leftrightarrow Ca^{2+}(aq) + 2OH^-(aq) \quad \text{[Reaction Formula 1]}$$

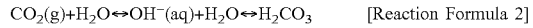

$$CO_2(g) + H_2O \leftrightarrow OH^-(aq) + H_2O \leftrightarrow H_2CO_3 \quad \text{[Reaction Formula 2]}$$

According to Reaction Formula 2, gaseous $CO_2$ is dissolved in an aqueous solution and reacts with water to form $H_2CO_3$.

$$H_2CO_3 + OH^-(aq) \leftrightarrow HCO_3^-(aq) + H_2O$$

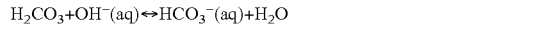

$$HCO_3^-(aq) + OH^-(aq) \leftrightarrow CO_3^{2-}(aq) + H_2O \quad \text{[Reaction Formula 3]}$$

The presence of calcium ions derived from supersaturated Portlandite and the obtained carbonate ion can easily precipitate calcium carbonate according to the above Reaction Formula 3.

$$Ca(OH)_2(s) + CO_2(g) \leftrightarrow CaCO_3(s) + H_2O \quad \text{[Reaction Formula 4]}$$

The overall reaction procedure is according to Reaction Formula 4 above.

The thermodynamic and mineralogical properties suggest that the production of solid materials through reaction processes according to the above reaction formulas can easily occur and that the capture of carbon dioxide using alkaline paper mill waste sludge is very efficient and stable.

The paper mill waste sludge may contain iron, silicon, and aluminum ions in addition to calcium ions, and the extraction efficiency differs depending on the kind of acid corresponding to the ion species.

At this time, it is preferable to selectively use an acid in the acid treatment process of the paper mill waste sludge in consideration of the fact that the eluate is used in the carbonation process after the reduction.

Since the iron ion, silicon ion and aluminum ion coexist with calcium ions in the paper mill waste sludge but act as an obstacle to carbonation, it is preferable to add the reaction initiator and carbon dioxide to the ions and remove the ions before the carbonation is carried out.

The acid may be any one selected from a group consisting of nitric acid, hydrochloric acid, sulfuric acid, and acetic acid.

The acid decomposes paper mill waste sludge to form a colloid, and the ions contained in the paper mill waste sludge can be eluted into the eluate.

The efficiency of the paper mill waste sludge reduction method may be varied depending on the type of acid contained in the paper mill waste sludge and pulp sludge and the kind of acid in the acid treatment process may be selected depending on the ion species in the paper mill waste sludge.

At this time, it is very preferable to use hydrochloric acid when taking into consideration the efficiency depending on the type of acid, considering the fact that the eluate is used in the carbonation process by reacting the eluate with carbon dioxide after the paper mill waste sludge reduction process.

The acid having a concentration of 1 to 5 N can be used.

When the concentration of the acid is out of the above range, it is difficult to control to an appropriate equivalent amount when reacting with ions in the paper mill waste sludge.

The paper mill waste sludge is prepared in step S100, and an acid is added to the paper mill waste sludge and reacted to produce a mixed solution in step S200.

The amount of acid added to the paper mill waste sludge may be 1.0 to 1.5 equivalents relative to the total amount of the ionic sludge. If the amount is outside the above range, an unnecessary acid is added to increase the treatment cost or reduce the extraction efficiency of ions in the paper mill waste sludge, there may be a problem that the effect of reducing paper mill waste sludge is reduced.

On the other hand, in the step of preparing the paper mill waste sludge, the paper mill waste sludge can be dried and pulverized in the air to be grain-refined.

If the paper mill waste sludge is not dried and pulverized, the reactivity with acid is reduced during the acid treatment, so that the contained ions may not be extracted sufficiently.

The stirring step may be performed at 200 to 300 RPM using a stirrer.

When stirring is performed in the above range, the paper mill waste sludge-containing ions may be extracted by reacting with the acid so that the extraction efficiency can be increased.

In addition, if the stirring range is less than 200 rpm, a problem may arise in which bubbles generated after acid addition cannot be sufficiently removed.

The eluate may be separated from the mixed solution in step S300 and separated into an eluate and a solid residue.

At this time, the eluate contains a large amount of calcium ions, which is used in the carbonation process of carbon dioxide, and the remaining solid matter is reduced by 80% or more with respect to the total weight of the paper mill waste sludge, the efficiency of the paper mill waste sludge treatment process can be greatly increased. The remaining solids separated from the eluate exhibition of high heat content and can be utilized as a new energy source.

On the other hand, waste sludge can be reduced by treating pulp sludge mixed with pulp and paper in addition to paper mill waste sludge that can be discharged from the papermaking process, and recovering solid material by separating the eluate.

Since the amount of calcium ion to be carbonated is relatively small compared to the amount of iron ions and silicon ions to be injected in the pulping process of the wood, it is not easy to high-purity carbon dioxide using an eluate produced by acid treatment when pulp sludge is contained in a large amount.

Therefore, carbonation of carbon dioxide after carbonation through acid degradation is highly desirable to carbonation paper mill sludge.

In the step of separating the eluate from a supernatant of the mixed solution, the mixed solution may be filtered, and then the pressure may be applied or the precipitant may be added to precipitate the colloidal fine particles in step S300.

The sedimentation can increase the amount of pure potassium ions in the eluate, and in the absence of the sedimentation process, the efficiency of carbon dioxide carbonization can be reduced depending on the kind of ions in the eluate.

A basic substance may be added to the eluate and the pH may be adjusted to precipitate some ions in the eluate in step S400.

The basic material may be caustic soda (NaOH).

A basic substance may be added to the eluate to change the pH to 11.5 to 12.5.

When the pH of the eluate is changed by adding the caustic soda, high purity calcium carbonate can be formed by precipitating silicon and aluminum ions which interfere with carbonation other than calcium ions.

The pH can be determined using the acid dissociation constant pK value for hydroxide in water.

The pK value of $CaOH^+$, the primary hydroxide of calcium ion, is 1.2, indicating that calcium salt is formed at pH 12.8. On the other hand, aluminum, iron magnesium and the like have a larger pK value, thereby generating a hydroxide flame in a low pH range. Therefore, most of these inhibitory components are precipitated in a range lower than the pH at which precipitation of calcium ions is formed, so that the resulting precipitate can be centrifuged or filtered to be selectively removed.

By adding the caustic soda sequentially to the solution to increase the pH to 12.5, the resulting precipitates are filtered to remove most of the disturbing components and to produce a pure solution of pure calcium ions.

A reaction initiator may be added to the eluate and carbon dioxide may be injected for carbonation in step S400.

The reaction initiator may be any one selected from a group consisting of methylamine, dimethylamine, isopropylamine, or cyclohexylamine as neutral alkylamines.

Other than the neutral alkylamine, there is a problem that it is volatile as a gas at room temperature, which makes it difficult to use in the process, and it is expensive, which may cause a problem of increasing the overall cost of the process and is not easy to recover after the carbonation reaction Although methylamine is excellent in reactivity, environmentally friendly, and has the advantage of confirming the reaction, it may cause unstable problems when it is introduced into the process with gas at room temperature, and the dimethylamine may exhibit low vapor pressure and low reactivity, and the cyclohexylamine may also exhibit low vapor pressure and low reactivity, and the problem of partial hydration may arise.

Therefore, the neutral alkylamine can be selected according to the necessity of directly confirming the reaction process or the type of aeration in an open system or the type of a closed high pressure reactor.

At this time, isopropylamine is most preferable because it exhibits optimum reactivity and solubility.

When 20% (w/w) neutral alkylamine is added to the reaction initiator and carbon dioxide is injected to precede the carbonation reaction, the carbonation efficiency of the same volume as the sample can be 95% or more.

The alkylamine promotes carbonate ion generation and promotes the carbonation of carbon dioxide.

In addition, the method may further include a step of adding a reaction initiator to the eluate and adding carbon dioxide to the carbonation reaction, followed by dialysis to recover the amine.

If a neutral amine is selected as the reaction initiator, there is an advantage that the process cost can be greatly reduced by recovering the expensive amine.

In the step of performing carbonation by injecting carbon dioxide, carbon dioxide may be aerated in the eluate or pressurized to 20 to 30 bar in a high pressure reactor to inject carbon dioxide.

In the case of adding carbon dioxide in the high-pressure reactor, carbonation proceeds sufficiently when injected in the above-mentioned range, and when it exceeds 30 bar, there is no effect of increasing carbonation.

FIG. 3 is a conceptual diagram illustrating an overall system of carbon dioxide high purity carbonation method using paper mill waste sludge according to another embodiment of the present invention.

Referring to FIG. 3, a high purity carbonation method of carbon dioxide using paper mill waste sludge according to an embodiment of the present invention will be described. After the reaction tank is prepared and the paper mill sludge is pulverized and grain-refined, it is added to the reaction tank, and the acid is added and stirred. When acid is added to paper mill waste sludge during the decomposition of paper mill waste sludge through acid treatment, bubbles are formed temporarily and gradually sink as the continuous stirring process proceeds.

Therefore, the stirring process of the reactor is very effective to stably form the mixed solution in the acid treatment process of the paper mill waste sludge.

The volume of the reaction tank is set to be about 10 times the total volume of the sample and the acid solution. Considering the difficulty of solid-liquid separation filtration, it is possible to attach a mobile filtration device so that the supernatant liquid can be sequentially applied after allowing the particulate matter to settle down as much as possible.

In the sinking tank, the colloidal fine particles remaining in the extract solution through the primary filtration device are submerged as much as possible by pressure or sedimentation. In the sedimentation tank, a base is added to raise the pH of the solution to precipitate disturbing ions. The eluate obtained through this process is a pure calcium ion solution, which is transferred to the carbonation tank and reacted with the carbon dioxide introduced into the carbonation tank to carbonate at a high purity.

The carbonation tank is preferably constructed by an autoclave method capable of controlling the temperature and the pressure, and it is not necessary that the carbonation tank is high temperature and high pressure.

Hereinafter, the present invention will be described in more detail with reference to the following examples. However, the scope of the present invention is not limited to the following examples.

Example 1: Acid Decomposition of Waste Sludge

1. Sample Preparation

Four types of pulp sludge samples were selected for each kind of paper production. Pulp sludge was collected from Moorim P & P (hereinafter referred to as "sample 1") from Ulsan which is the only pulp processing producer in Korea. The pulp sludge was a mixture of sludge generated in the pulp production process and sludge in the papermaking production process, and the ratio of pulp sludge to paper mill waste sludge was 8:2.

Paper mill waste sludge is used a typical paper mill waste sludge generated in the process of producing paper by processing pulp, which is collected from Ulsan's Korean paper (hereinafter referred to as "sample 2"), and recycled paper sludge generated from the process of producing corrugated board and white board using recycled paper was obtained from Sekaha Paper (hereinafter referred to as "Sample 3") and Azine P & P (hereinafter referred to as "Sample 4") of Daegu Metropolitan City.

Various kinds of acids were treated to decompose the paper mill waste sludge and the pulp sludge, preparing a high concentration of nitric acid (60%), hydrochloric acid (36%), sulfuric acid (95%) and acetic acid (99.5%), and ammonium chloride ($NH_4Cl$), ammonium sulfate ($NH_4SO_4$), ammonium bisulfate ($NH_4HSO_4$), and ammonium nitrate ($NH_4NO_3$) were used as analytical grade reagents from certified manufacturers without any further reprocessing for comparison.

The concentrated acid was diluted with deionized distilled water and used according to the application, and the prepared nitric acid was stored in a brown bottle to prevent denaturation and stored in a cold dark place. In order to filter the solid matter from the decomposed solution, it was filtered with a vacuum filtration apparatus under atmospheric pressure or reduced pressure using paper filters of 5A, 5B, 5C standard of Whatman Co. and various types of glass fiber filters. The sample was treated with a magnetic stirrer and the combustion test was carried out using an electric furnace at 1000° C. To clarify the composition of the sample by calculating the weight loss ratio according to the stepwise temperature increase, the subjects were classified respectively as moisture, volatile substances, quasi-volatile substances, calcium carbonate, and nonvolatile solid residues at 105° C., 250° C., 600° C., and 950° C.

2. Sample Preparation

The target samples were allowed to stand at room temperature and dried or used as they were. The dried sample was allowed to stand for a long time and the completely dried material, pulverized by drying and grain-refined. For the comparative experiments, the heat-treated samples were separately prepared and classified as volatile removal samples treated at 200° C., organic matter removal samples treated at 600° C., calcium carbonate decomposition treated at 950° C., and pure combustion residue (ash). The saw sample with a large amount of water is in a lump state and an acid solution was added to crush the lumps and partially crush them in order to facilitate the contact with acid. Since these samples were decomposed in the acid treatment and agglomeration process, most of the lumps were colloidal, the degradation characteristics were not considered according to the particle size, and therefore the dry pulverized samples were also used without particle size selection process.

3. Acid Treatment Decomposition and Combustion Experiments

An untreated raw sample, a normal-temperature dried sample, and an appropriate amount of a sample heated at 200° C., 600° C., and 950° C. were taken in a beaker. The amount of sample was adjusted to the same amount as the raw sample when the water content and the combustion reduction were corrected.

The total ion equivalent was determined to calculate the total equivalent of the pure divalent ions obtained from the X-ray fluorescence (XRF) analysis, a diluted acid solution corresponding to 1.5, 2.0 equivalents to the total ion equivalent of the sample was added, and the reaction was carried out at 200 to 300 rpm at room temperature or heated state in a heated magnetic stirrer. When an acid is added to the sample, a large amount of bubbles are generated due to the decomposition of the sample. Therefore, the acid is gradually added to the beaker in a volume of 10 times the volume of the sample solution. After the addition of the acid, the bubbles prevented the container from overflowing and after stirring for 1-3 hours, it is left for a long time or centrifuged avoiding the maximum amount of suspended matter. The separated filtrate was subjected to inductively coupled plasma (ICP) analysis so as to have a constant volume for determination of ion concentration. The filtered solid residue was dried at 80° C. for combustion experiments and calorimetric analysis and stored in desiccate.

For the combustion test, the weight loss was obtained under the condition of the stepwise heating operation using the electric furnace equipped with the temperature programming function capable of processing up to the maximum temperature of 1000° C., The weight loss at the time of filter processing was obtained and corrected by treating simultaneously the same type of filter used in the background state.

Example 2: High Purity Carbonation Through Base Treatment and Reaction Initiator 1. PH Control by Addition of Basic Substance Carbonation reaction was carried out whereby the paper mill waste sludge eluate obtained by decomposing paper mill waste sludge samples with hydrochloric acid was aerated in an open system and whereby calcium carbonate is obtained by reacting with a large amount of calcium and carbon dioxide in the eluate reacting with carbon dioxide in a closed high pressure reactor system.

The initial hydrochloric acid eluate was added with or without amine, and the hydrochloric acid eluate was added with a base to adjust to pH 12 separated from those with or without amine. We compared the results with actual gas containing over 99% pure carbon dioxide and 15% carbon dioxide gas based on nitrogen prepared by simulating actual exhaust carbon dioxide gas.

2. High-Purity Carbonation in an Amine-Added Eluate

Carbonation was carried out in the eluate with amine added to confirm the formation of calcium carbonate by the addition type carbonation of the neutral alkylamine to the eluate with the pH changed by adding the base.

Amines can be classified into weakly acidic alcoholic amines and neutralized alkyl-based amines. In consideration of ease of recovery and carbonation reactivity after carbonation reaction, 4 types of methylamine, cyclohexylamine, isopropylamine, and dimethylamine were considered.

The double methylamine is excellent in reactivity and has the advantage of being able to observe the progress of the reaction in a clear solution state. However, since it is a gas at room temperature, highly volatile and expensive, and there is a problem due to the recovery rate in the recovery process after the reaction. The other three amines showed similar reactivity, but in the case of hexylamine and diethylamine having relatively high molecular weights, it was found that the solution state was cloudy and cloudy due to low solubility in the reaction process.

In the case of isopropylamine, it was applied to most of the experiments, showing the appropriate reactivity and solubility.

Isopropylamine was selected as a reaction initiator. Carbon dioxide was injected into 200 mL of these solutions at a pressure of 2 bar in a closed system, and the degree of high-purity carbonation according to the amount of 20% isopropylamine was confirmed at room temperature.

Experimental Example 1: Sample Composition Analysis and Reduction Effect by Acid Decomposition 1. Sample Composition Analysis The composition and sample characteristics of pulp sludge and paper mill waste sludge were determined.

Table 1 shows the result of measuring the weight loss after the stepwise heating treatment. The samples were taken three times per quarter and expressed as the range of the measured values of the samples.

TABLE 1

| By sample | Moisture content (%) | Volatile substance (%) | Combustion residual amount (Ash, %) | calorie (cal/g) | Remarks |
|---|---|---|---|---|---|
| Sample 1. | 50-75 | 20-22 | 18-20 | 1450-1580 | Mixed |
| Sample 2. | 55-65 | 22-25 | 16-19 | 1890-2050 | Paperback |
| Sample 3. | 60-70 | 23-26 | 14-16 | 2250-2380 | White board |
| Sample 4. | 45-55 | 28-32 | 13-15 | 1660-1820 | Corrugated board |

The moisture contents of all the samples were about 45-70%, which is the largest proportion. In the case of the sample 1, the water content is broadly distributed as a result of lowering the water content through the second half process improvement. The total amount of solid materials excluding moisture is in the range of 30-45%, the volatile substances including organic matter is 60%, and the remaining inorganic ionic residues were found to be about 40%. The calorific value was obtained from a dry sample at room temperature. The pulp sludge had a low calorific value as a result of about 1500 cal/g, and most of the paper mill waste sludge had a calorific value of about 2000 cal/g. Considering that it absorbs about 40% of the raw sample and absorbs a lot of heat energy when water evaporates, this result can be expected to have a calorific value of less than 500 cal/g for a raw samples that are not dried, it was confirmed that the paper mill waste sludge showed a very low value compared with the heat value required for energy conversion of the waste even though the paper sludge contains a large amount of woody organic matter.

Therefore, it is concluded that paper mill sludge and pulp sludge are not suitable for incineration after heat treatment.

In order to determine the main constituent content of inorganic ionic materials, the combustion residual component obtained by conversing at 950° C. was taken and subjected to XRF analysis and is shown in Table 2 below.

TABLE 2

|  | CaO (%) | Mg2O3 (%) | SiO2 (%) | Fe2O3 (%) | Al2O3 (%) |
|---|---|---|---|---|---|
| Sample 1. | 25-33 | 1.1-2.0 | 5.0-5.9 | 41-48 | 6.7-7.8 |
| Sample 2. | 78-83 | 1.2-1.8 | 6.0-6.8 | 0.9-1.3 | 4.5-5.3 |
| Sample 3. | 57-62 | 1.5-2.3 | 7.7-8.5 | 5.5-6.7 | 10-12 |
| Sample 4. | 55-60 | 3.8-4.4 | 18-24 | 2.4-3.2 | 8.8-9.7 |

In case of sample 1, which is mostly pulp sludge, it is found that iron oxide is present in the majority, and calcium oxide derived from paper mill waste sludge accounts for about 30%.

In the other paper mill waste sludge, calcium oxide occupies about 60-80%, which is the main concern, accounts for about 60-80% of the total amount of residual inorganic matter, and Sample 2, the sludge discharged from the white paper manufacturing process showed the highest content.

It was confirmed that the amount of the silicon oxide other than these components was relatively large. Sample 4, which is paper mill waste sludge produced from recycled paper corrugated paper, showed a very high content of about 20%, which was significantly different from the content of 6% of Sample 1.

In addition, the content of aluminum oxide was similar to that of aluminum oxide of 5-10%, and it was confirmed that the amount of magnesium oxide, which is the major component of carbonation, is very low in most samples.

On the other hand, X-ray diffraction analysis was performed to investigate the crystal structure of solid materials in the paper mill waste sludge.

Figure 4:
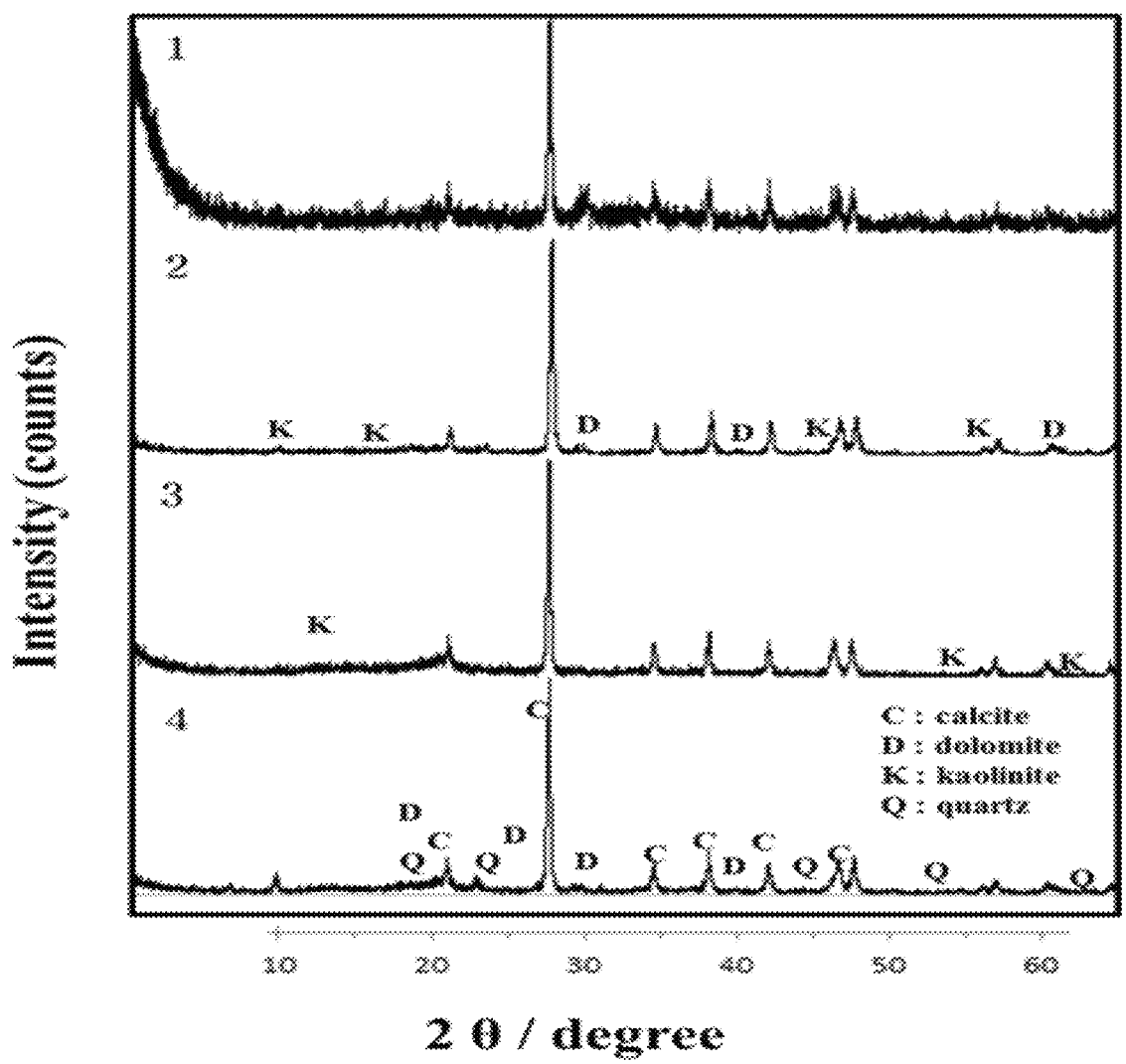
FIG. 4 is a graph of an X-ray diffraction analysis of a raw material in a high purity carbonation method of carbon dioxide using paper mill waste sludge according to another embodiment of the present invention.

FIG. 4 is a graph of X-ray diffraction analysis of a raw material in a method for reducing paper mill waste sludge through acid decomposition according to another embodiment of the present invention.

Referring to FIG. 4, in Sample 1, no other crystal structure except calcite ($CaCO_3$) was observed, and a trace amount of rock salt was detected, but the signal intensity was weak and not clearly shown. In Sample 2, most of calcite, calcite type dolomite [$CaMg(CO_3)_4$], and kaolin-based silicon of kaolinite [$Al_2Si_2O_4$ $(OH)_4$] as compound were found to be present in trace amounts.

In Sample 3 and Sample 4, which are recycled paper mill waste sludge, a peak of fine kaolinite was detected as in Sample 2, and in Sample 4, dolomite and quartz ($SiO_2$) were also detected.

In general, the presence of silicon compounds was confirmed in three kinds of paper mill waste sludge, and calcium carbonate peak of calcite type was found to occupy the majority of all samples.

FIG. 5 is a graph showing a result of thermo gravimetric analysis according to a raw material in a high purity carbonation method of carbon dioxide using paper mill waste sludge according to another embodiment of the present invention.

Referring to FIG. 5, all the samples showed a gradual weight loss up to 200° C., followed by a sudden weight reduction to 450° C. and a secondary rapid decrease pattern at 600° C. to 750° C.

Figure 5A:
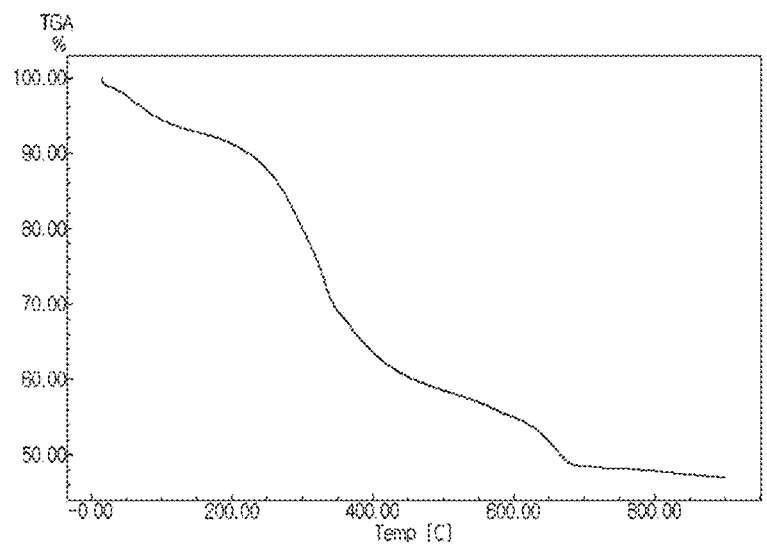
FIG. 5a is a graph showing a result of thermo gravimetric analysis according to a raw material (sample 1) in a high purity carbonation method of carbon dioxide using paper mill waste sludge according to another embodiment of the present invention.

In FIG. 5a, Sample 1 shows that the abrupt decrease range of the second stage is formed at a temperature range of 20-50° C. lower than that of the other samples, and the attenuation slope at a lower temperature range up to 200° C. is also formed steeply.

This indicates that various organic materials derived from wood are composed of materials with higher volatility than paper mill waste sludge, and the other two types of paper mill waste sludge have similar temperature ranges.

Figure 5B:
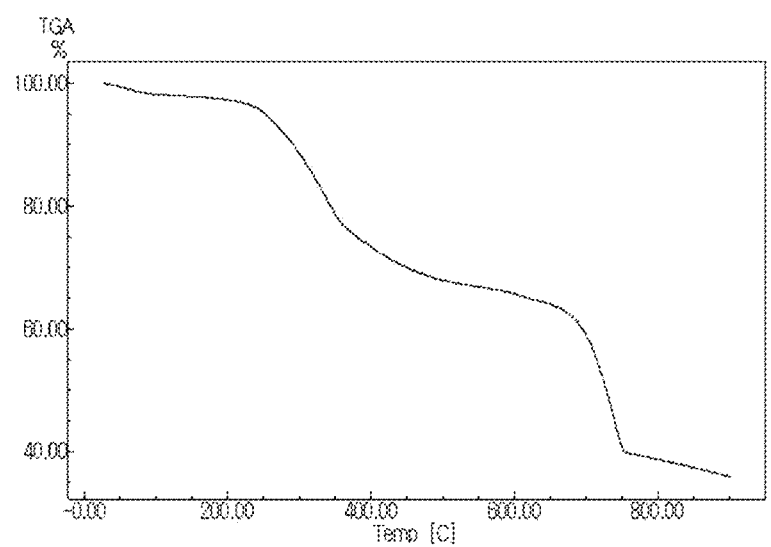
FIG. 5b is a graph showing a result of thermo gravimetric analysis according to a raw material (sample 2) in a high purity carbonation method of carbon dioxide using paper mill waste sludge according to another embodiment of the present invention.
Figure 5C:
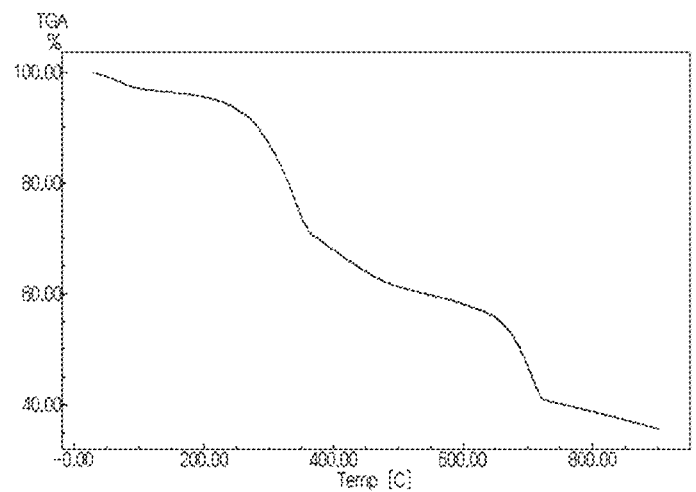
FIG. 5c is a graph showing a result of thermo gravimetric analysis according to a raw material (sample 3) in a high purity carbonation method of carbon dioxide using paper mill waste sludge according to another embodiment of the present invention.
Figure 5D:
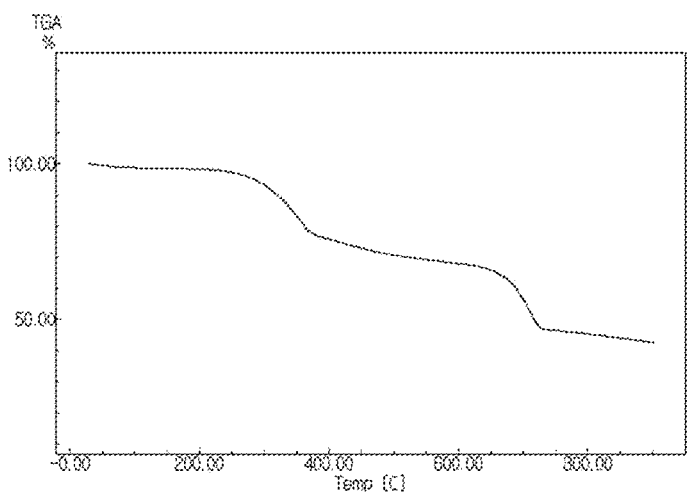
FIG. 5d is a graph showing a result of thermo gravimetric analysis according to a raw material (sample 4) in a high purity carbonation method of carbon dioxide using paper mill waste sludge according to another embodiment of the present invention.

In FIG. 5b, the sample 2 shows a somewhat large decrease in the temperature range up to 600° C., but the difference is not large.

Meanwhile, a Fourier transform spectrometer (hereinafter referred to as 'FT-IR') was performed to confirm the presence of calcium carbonate in the sample.

FIG. 6 is a graph showing Fourier transform analysis results according to raw samples in a high purity carbonation method of carbon dioxide using paper mill waste sludge according to another embodiment of the present invention.

Referring to FIG. 6, it can be seen that a characteristic series of 1420, 870 and 711 cm$^{-1}$ according to the Ca—O stretching vibration and the bending vibration of calcium carbonate in all the samples, the characteristic peaks of other materials apart from these peaks are not identified. It is considered that the peak due to the stretching vibrations of $CH_2$ and $CH_3$ near 2980 cm$^{-1}$ are not detected even though they contain a large amount of the lipid organic material derived from the wood, it seems to be absorbed by various inorganic oxide structures in the sample matrix and covered by the functional properties.

2. Acid Decomposition Effect

A typical acid of Hydrochloric acid, nitric acid, sulfuric acid, an organic acid of acetic acid, and ammonium chloride, ammonium nitrate, ammonium sulfate and ammonium sulfonate are stirred at a rate of 200-300 revolutions per minute under normal temperature and normal pressure, it was intended to understand the decomposition characteristics and extract efficiency.

These treatments were selected by considering the selective decomposition characteristics of three representative strong acids and weakly acidic acetic acid which are low in price and high in decomposition of organic matter as well as excellent extraction efficiency of alkaline based portlandite of ammonium salt solution, etc. As a result of the experiment, it was not possible to obtain the decomposition effect of the sample with 4 kinds of ammonium type treatment agents, and it was excluded because the effect of detoxification and reduction of paper mill waste sludge could not be obtained prior to the extraction effect of ions.

TABLE 3

|  | element | nitric acid(%) | Hydrochloric acid(%) | Sulfuric acid (%) | Acetic acid (%) |
|---|---|---|---|---|---|
| Sample 1 | Ca | 87 | 84 | 17 | 89 |
|  | mg | 76 | 78 | 24 | 48 |
|  | Fe | 67 | 58 | 89 | 11 |
|  | Al | 65 | 51 | 69 | 42 |
| Sample 2 | Ca | 87 | 85 | 5.6 | 91 |
|  | mg | 93 | 90 | 69 | 88 |
|  | Fe | 66 | 63 | 78 | 15 |
|  | Al | 56 | 48 | 56 | 45 |
| Sample 3 | Ca | 93 | 90 | 11 | 89 |
|  | mg | 90 | 65 | 36 | 45 |
|  | Fe | 77 | 69 | 78 | 24 |
|  | Al | 62 | 45 | 55 | 54 |
| Sample 4 | Ca | 85 | 90 | 6.3 | 88 |
|  | Mg | 74 | 87 | 32 | 68 |
|  | Fe | 68 | 49 | 75 | 26 |
|  | Al | 48 | 35 | 56 | 49 |

Table 3 shows the results of ICP analysis of a solution obtained by treating three types of strong acids and acetic acid with a concentration of 1N and 1.5 times the total equivalent amount of the paper mill waste sludge sample at a room temperature and atmospheric pressure.

It shows the results that the extraction efficiency of nitric acid, hydrochloric acid and acetic acid is similar for all components except iron ion in all samples, and it can be seen that the high extraction efficiency for calcium magnesium and the relatively low extraction efficiency for aluminum. And it shows that the extraction efficiency of calcium magnesium ion in sulfuric acid treatment is very low, the extraction efficiency of iron and aluminum is relatively high, and the extraction efficiency of iron ions in acetic acid is very low.

In general, this result can be interpreted as reflecting the composition and structural characteristics of the sample sludge. In addition, it is considered that the extraction efficiency result is greatly affected by the crystal structure of the ions in the solid matrix and the reactivity with the treatment reagents, the formation of salts of iron ions, acetate and ions, and precipitation of Calcium magnesium and sulfate ion.

In the case of sample 1 composed of most pulp sludge, a large amount of iron component injected in the pulping process of wood is the mainstream, so that the highest total ion extraction efficiency is obtained when sulfuric acid is treated, whereas it can be seen that this is limited for paper mill waste sludge where calcium ion content is the most.

Therefore, the treatment of sulfuric acid is considered to be applicable only when it is necessary to consider the carbonation of pulp sludge using iron ions. However, it is very useful in reducing the detoxification of secondary pulp sludge waste that does not consider carbonation after the reduction of waste sludge. Based on the above results, the total extraction efficiency of the samples with respect to the main components of interest in terms of the content of interest was highest when sulfuric acid was used for sample 1, acetic acid was used for sample 2, nitric acid was used for sample 3 and hydrochloric acid was used for sample 4. However in the three types of paper mill waste sludge except sample 1, the extraction of calcium ions for the carbonation of calcium is the main target. Therefore, the coexistence of other ions simultaneously extracted from calcium ions is an obstacle to the carbonation of calcium.

From this point of view, it is preferable to use acetic acid having a very low extraction efficiency of iron ions, but it has a disadvantage of inherently bad odor, comparatively high price and low decomposition of calcium carbonate. And nitric acid shows high degree of decomposition in all samples, and its extraction efficiency is relatively high and their use is limited due to their inherent properties such as denaturation or toxicity enhancement in contact with oxygen or light in the air. Therefore it is considered desirable to use hydrochloric acid, which has the highest resolution in all samples, high extraction efficiency for calcium ions, and decomposition ability of calcium carbonate.

Meanwhile, in order to compare and verify the results of Table 3 obtained from the ICP analysis results of the decomposed and extracted filtrate, XRF analysis was performed on the solid matter as a filtration residue by dry pulverization. The results are shown in Table 4 below.

TABLE 4

|  | CaO (%) | Mg2O3 (%) | SiO2 (%) | Fe2O3 (%) | Al2O3 (%) |
|---|---|---|---|---|---|
| Sample 1. | 91 | 81 | 81 | 79 | 78 |
| Sample 2. | 93 | 83 | 66 | 63 | 72 |
| Sample 3. | 91 | 84 | 72 | 68 | 67 |
| Sample 4. | 92 | 74 | 58 | 61 | 64 |

The above results are compared with the results of Table 2 obtained from the burned combustion ash material for the dry solid material filtered after treating the excess sample under the same conditions using hydrochloric acid.

The results obtained are similar to or slightly different from those of Table 3, which is the result of the ICP analysis of the filtrate solution. The major component calcium, which is the main ingredient in large amount shows similar results. Since the content of other components is very small, it is considered that the difference in the results of the small error range indicates the difference in the extraction efficiency with large extraction efficiency. The results obtained are similar to the previous results, such as the high extraction efficiency of calcium and the relatively low extraction efficiency of other interfering ions.

TABLE 5

| Target Sample | Decomposition attenuation amount | Filter level | Calories (cal/g) |
|---|---|---|---|
| Sample 1 | 84 | 16 | 4580 |
| Sample 2 | 82 | 18 | 4400 |
| Sample 3 | 86 | 14 | 4500 |
| Sample 4 | 88 | 12 | 3080 |

The filtered residue of the filter was dried and it was determined by the decomposition of the attenuation amount of the hydrochloric acid treatment to the amount of decrease in initial original sample throughput. The results obtained by calorimetry are also shown in Table 5 above.

It can be seen that at least 80% of the initial sample throughput is attenuated in all the samples. Considering that residual wastes such as lignin and cellulose mainly have high heat content so that the energy conversion of waste is easy, high-cost processing is actually required. It was confirmed that most of the paper-related sludge wastes with high environmental risk can be effectively treated.

In the comparative experiments performed to ascertain the extraction efficiency by increasing the treatment temperature and the acid treatment amount, the temperature rise up to 50° C. and the change of the conditions at 2.0 and 2.5 relative to the equivalence ratio, in change condition depending on temperature, concentration or mixed application condition, the ion extraction efficiency was compared with the above results at room temperature and equivalence ratio of 1.5. It shows that the extraction efficiency increased by 2-3% at each or simultaneous application condition, but the increase of extraction efficiency was not so large and it was considered that the effect would not be great considering the additional cost factors.

Accordingly, the method of reducing waste sludge by acid decomposition according to one aspect of the present invention is a method of reducing acid sludge by pulverization or pulp sludge, which is a by-product of pulp or papermaking production process, So that the efficiency of the waste sludge treatment process can be greatly increased.

Experimental Example 2: High Purity Carbonation Through Base Treatment and Reaction Initiator 1. Carbonation Effect by Base Treatment In the carbonation process, it is known that carbonate ion generation easily occurs at a pH value of about 9 or higher, so that carbonation with calcium ion can easily occur and calcium carbonate is easily produced. However, in the example, in the paper mill waste sludge sample solutions decomposed and eluted with hydrochloric acid, there was no reaction to form calcium carbonate by carbonation of the eluate whose pH was adjusted to 12 by treating the initial acidic eluate or base in all processes where carbon dioxide is pressurized to a pressure of 30 bar in an aeration system or in a high pressure reactor.

It is presumed that the main reasons why carbonation does not occur are that under graded organic material acts as an interfering factor for carbonation due to the properties of paper milled sludge containing a large amount of organic materials, or the intensity of the ionic strength is increased overall by using a strong, or Excess chlorine ion acts as an interfering factor in calcium carbonate formation.

On the other hand, in the reaction in which the neutral alkylamine is added to the paper mill waste sludge eluate, it was found that the carbonation was easy to occur in the initial acid solution as well as in the basic solution with the high pH. Therefore, the subsequent carbonation process using the paper mill waste sludge eluate confirmed the high purity carbonation reaction after amine addition.

TABLE 6

|  |  | Ca | mg | Fe | Al | SiO2 |
|---|---|---|---|---|---|---|
| Acid treatment eluate | Sample 1 | 17700 | 362 | 62.2 | 569 | 27.9 |
|  | Sample 2 | 18600 | 472 | 82.4 | 236 | 202 |
|  | Sample 3 | 17500 | 90.6 | 229 | 678 | 103 |
| Base treatment pH 11.5 | Sample 1 | 22100 | 0.41 | 3.17 | 8.26 | 1.07 |
|  | Sample 2 | 36100 | 0.49 | 5.91 | 2.31 | 3.38 |
|  | Sample 3 | 18400 | 0.63 | 5.66 | 25.1 | 1.50 |
| Base treatment pH 12.5 | Sample 1 | 13400 | — | — | 1.28 | 2.68 |
|  | Sample 2 | 3610 | — | — | 1.03 | 3.44 |
|  | Sample 3 | 2500 | — | — | 1.26 | 2.45 |

Table 6 shows the results of ICP analysis of the main target ions in the eluate adjusted to pH 11.5 and pH 12.5 by treating with the eluate and hydrochloric acid treatment, respectively.

The calcium ion concentration of the three kinds of hydrochloric acid decomposition eluate of the target samples shows a high content of 17500~18600 mg/L, and it can be seen that it occupies most of the ion concentration of the eluate and the concentration of the other ions is slightly present. As the pH was increased by adding an alkali solution, the concentration of calcium ion gradually decreased and decreased to about ⅓ at pH 11.5 and to about ⅕ at pH 12.5. Most of the ions other than calcium ion are removed by precipitation as the pH value increases. It was confirmed that the selective precipitation of these ions at low pH range compared to calcium ion was found to be effective for elimination of interfering ions of carbonation of calcium ions and high purity for improving product value of calcium carbonate.

2. High Purity Carbonation Effect by Reaction Initiator Treatment

TABLE 7

|  |  | Amount of 20% isopropylamine (IPA) added (mL) | | | | | | | |
|---|---|---|---|---|---|---|---|---|---|
|  |  | 200 | 150 | 100 | 50 | 40 | 30 | 20 | 10 |
| Acid treatment eluate | Sample 1 | 99.3 | 97.6 | 96.5 | 96.9 | 87.2 | 71.4 | 41.5 | 5.2 |
|  | Sample 2 | 99.7 |  |  |  |  |  |  |  |
|  | Sample 3 | 99.1 |  |  |  |  |  |  |  |
| Base treatment pH 11.5 | Sample 1 | 94.8 | 94.9 | 94.2 | 92.1 | 82.0 | 78.8 | 53.7 | 19.2 |
|  | Sample 2 | 94.8 |  |  |  |  |  |  |  |
|  | Sample 3 | 98.8 |  |  |  |  |  |  |  |

TABLE 7-continued

| | | Amount of 20% isopropylamine (IPA) added (mL) | | | | | | | |
|---|---|---|---|---|---|---|---|---|---|
| | | 200 | 150 | 100 | 50 | 40 | 30 | 20 | 10 |
| Base treatment pH 12.5 | Sample 1 | 95.3 | 95.5 | 94.3 | 94.8 | 72.5 | 52.5 | 45.3 | 35.8 |
| | Sample 2 | 98.8 | | | | | | | |
| | Sample 3 | 97.5 | | | | | | | |

Table 7 shows the carbonation efficiency (based on calcium, %) of paper mill waste sludge using isopropylamine, analyzed by ICP.

As shown in Table 6, it can be seen that when the amount of isopropylamine added is 50 mL or more, most of the calcium ions are carbonated, and as the amount of addition is decreased, the carbonation efficiency is gradually lowered. From these results, it was confirmed that most of the calcium ions were easily carbonated in a 20% amine solution of ¼ or more of the volume of the sample without depending on the concentration.

The carbonation experiments in a closed system using virtual real carbon dioxide gas were conducted by mixing samples of acid eluate with 3 kinds of solutions and adjusting the pH to 11.5 and 12.5. The carbonation efficiency for the pressure change at 10 mL of 20% amine addition was determined. The results are shown in Table 8 below.

TABLE 8

| | 2 bar | 5 bar | 10 bar | 20 bar | 30 bar |
|---|---|---|---|---|---|
| pH = 0.48 | 20.5 | 64.4 | 77.7 | 99.9 | 99.9 |
| pH = 12 | 39.5 | 44.4 | 53.3 | 60.7 | 99.9 |

At this time, the calcium ion concentrations of these ions were 17,000 mg/L and 6,000 mg/L, respectively, and the pH values were 0.48 and 12, respectively.

Referring to Table 8, when the pure carbon dioxide gas was used under the same condition of 2 bar pressure, the calcium ion carbonation result of the lower pH value of 0.48 was about 20% and the pH value of 12 was about 40%. It can be seen that the carbonation result is very low and then the carbonation efficiency is increased as the pressure is increased. As a result, the carbonation efficiency of the acid solution was increased to 20 bar and the alkali solution was carbonated at the pressure of 30 bar.

The increase of carbonation efficiency with pressure showed a steep slope in the acid solution.

These results show that the low carbonation yields lower carbonation efficiency than the alkali solution due to the lack of the absolute amount of carbon dioxide necessary to carbonize the high concentration calcium ions. However, it can be seen that the carbonation efficiency is much higher as the pressure is increased. Overall, it shows that the carbonation progress in the acid solution is easy.

This suggests that the formation of carbonate ion in the acidic solution is more straightforward. These results are in contrast to the result of general carbonation when amine is not added. It can be seen that the amine in the acidic solution promotes the formation of carbonate ion, which facilitates the progress of carbonation.

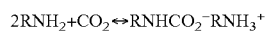

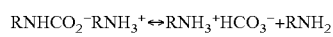

 [Reaction Formula 5]

Formula 5 shows the mechanism of the carbonate ion formation of the amine.

It is suggested that the formation of zwitterion, which is accompanied by + and − charge in the molecule by the reaction of amine and carbon dioxide. And this suggests that the formation of carbonate ion becomes easier in the acid solution as the reaction progresses.

The results of the carbonation of the open system in the form of carbon dioxide aeration showed that when amine was added, pure carbon dioxide or 15% virtual actual gas produced carbonated calcium carbonate in the total amount of carbon ions, but when amine was not added, no carbonation was achieved at all.

Therefore, it is advantageous to simply carbonate the solution after addition of amine to the decomposition eluate using acid, if it is aimed at the carbonation aiming at the reduction of carbon dioxide. It is preferable to increase pH and then proceed with carbonation by adding a base to the eluate to increase the usability and value of the produced carbonate byproduct.

Figure 7:
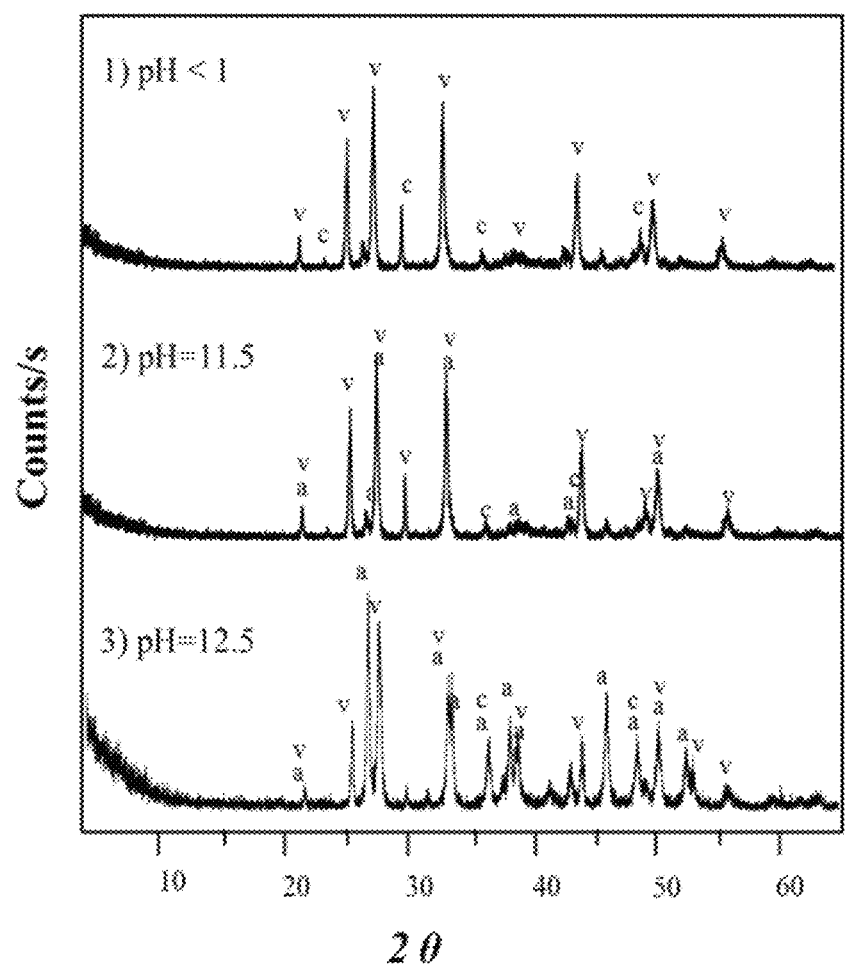
FIG. 7 is a graph showing the results of X-ray diffraction analysis of calcium carbonate according to pH in a high purity carbonation method of carbon dioxide using paper mill waste sludge according to another embodiment of the present invention.

FIG. 7 is a graph showing the results of X-ray diffraction analysis of calcium carbonate according to pH in a high purity carbonation method of carbon dioxide using paper mill waste sludge according to another embodiment of the present invention.

Referring to FIG. 7, carbonation of the eluate indicates that vaterite and calcite are present. Their relative contents were 97.5% for vaterite and 2.5% for calcite, indicating that most of them were formed as vaterite and aragonite did not appear.

On the other hand, it can be seen that the aragonite peak gradually increases with increasing pH of the eluate. The ratio of aragonite, vaterite and calcite according to pH was 13.5%, 79.3% and 7.7% at pH 11.5, respectively, and 72%, 26.9% and 1.1% at pH 12.5, it was confirmed that the form of calcium carbonate was gradually changed to aragonite.

Experimental Example 3: Recovery of Amine

Carbonation using the solution by the addition of amine to the paper mill waste sludge decomposition eluate with acid can be applied separately, as desired. The added amine is a relatively expensive compound, and recovery and reuse is indispensable.

When the acid eluate is directly applied to carbonation, it can be expected that excessive amounts of chloride ions, amine solutions, hydrogen ions, and trace amounts of divalent ions such as manganese and iron are present in the filtrate remaining after filtering out the calcium carbonate, which is a carbonation product, Most of the divalent ions were removed from the filtrate in which the eluate with the increased pH was carbonated, but It can be expected that excessive amounts of sodium ions or potassium ions originating from excess chloride ions and bases are present.

Therefore, refining is required because the excess of these ions deteriorates the function of the amine solution as a catalyst in reusing the amine solution.

In fact, the efficiency of carbonation using recovered amine solution after carbonation was 60~70% under the same conditions, It can be seen that the excessive influence of these ions on the reactivity of the amine is very large. An electrodialysis method was applied as a method for removing these excessive disturbing ions in a carbonated recovery solution using a carbonated solution or a basic solution using an acid eluate.

According to Reaction Formula 5, the acid solution contains an amine in a neutral state and an amphoteric ion in the molecule to exist in an electrically neutral zwitterion state. In the basic solution, the amine exists in a neutral state, so that when charged, the ionic material moves through the membrane. It is expected that only the pure amine substance will be present in the sample solution.

In this way, ion selective membranes that simultaneously pass monovalent and divalent ions were applied, and it was possible to selectively remove the acidic solution of low pH and the basic ion of basic solution of high pH. And an initial conductivity of 10, it exhibited a conductivity of 0.3 after about 2 hours of operation, and it was confirmed that most ionic substances were removed. The carbonation efficiency of the purified amine recovery solution under the same conditions was almost the same as that of the crude amine solution.

Accordingly, the method of high purity carbon dioxide using paper mill waste sludge according to the present invention can reduce the efficiency of the paper mill waste sludge treatment process by effectively decomposing paper mill waste sludge, which is a by-product of the papermaking process that is conventionally performed by landfill or incineration, the efficiency of the paper mill waste sludge treatment process can be greatly increased.

In addition, the extraction effect of each ion was confirmed in the eluate eluted with the acid treatment effect and Add neutral alkylamine, which has a high carbonation effect on calcium ions and can increase process efficiency, since carbon dioxide generated during paper production can be carbonated for performing the paper making process in a very environmentally friendly manner.

In addition, when pH is controlled by adding a basic substance during the carbonation process, the calcium carbonate formed by reaction with carbon dioxide can be highly purified, so that the produced high purity calcium carbonate can be commercialized and recycled.

Although the present invention has been described with respect to specific examples of the method for reducing waste sludge through acid decomposition and the method for high purity carbon dioxide using paper mill waste sludge according to the present invention, various modifications can be made within the scope of the present invention.

While the present invention of method for reducing waste sludge through acid decomposition and the method for high purity carbon dioxide using paper mill waste sludge has been particularly shown and described with reference to exemplary embodiments thereof, it is evident that many alternatives, modifications and variations will be apparent to those skilled in the art. It will be understood by those skilled in the art that various changes in form and details may be made therein without departing from the spirit and scope of the invention as defined by the appended claims.

In addition, since the present invention can be embodied in various forms, and should not be construed as being limited to the embodiments set forth herein. Rather, these embodiments are provided so that this disclosure will be thorough and complete and will fully convey the concept of the invention to those skilled in the art, and the present disclosure will only be defined by the appended claims.

What is claimed is:

1. A method of carbonating carbon dioxide with high purity using a paper mill waste sludge, comprising the steps of,
   (a) preparing a paper mill waste sludge which is a waste product discharged during paper production;
   (b) adding an acid to the paper mill waste sludge and reacting the acid therewith to produce a mixed solution and stirring;
   (c) separating a supernatant of the mixed solution into an eluate;
   (d) adding a basic substance to the eluate and adjusting pH to precipitate some of the ions in the eluate; and
   (e) adding a reaction initiator to the eluate in which some ions are precipitated and removed, and injecting carbon dioxide for a carbonation reaction,
   wherein the reaction initiator is a neutral alkylamine that is any one selected from a group consisting of methylamine, diethylamine, isopropylamine, and cyclohexylamine.

2. The method of claim 1,
   wherein the paper mill waste sludge contains calcium ions, and further comprises one or more ions selected from a group consisting of iron, aluminum, and silicon, as a carbonation inhibiting ion.

3. The method of claim 1,
   wherein, in the step of preparing the paper mill waste sludge, the paper mill waste sludge is dried in air, and then pulverized to be grain-refined.

4. The method of claim 1,
   wherein the acid is any one selected from a group consisting of nitric acid, hydrochloric acid, sulfuric acid, and acetic acid.

5. The method of claim 1,
   wherein the acid has a concentration of 1 to 5N.

6. The method of claim 1,
   wherein, in the step of adding acid to the paper mill waste sludge, 1.0 to 1.5 equivalents of an acid is added to a total ion equivalent weight of the paper mill waste sludge.

7. The method of claim 1,
   wherein, in the step of the stirring step, the mixed solution is stirred at 200 to 300 RPM using a stirrer.

8. The method of claim 1,
   wherein, in the step of separating the eluate from a supernatant of the mixed solution, the mixed solution is filtered and then pressured, or a precipitating agent is added to precipitate the fine particles within a colloid.

9. The method of claim 1,
   wherein the basic substance is caustic soda (NaOH).

10. The method of claim 1,
    wherein the basic substance is added to the eluate to change the pH to a range of 11.5 to 12.5.

11. The method of claim 1,
    wherein, in the step of precipitating some of the ions, iron, aluminum or silicon ions which are carbonation-inhibiting ions in the eluate, are precipitated.

12. The method of claim 1,
    wherein, in the step of injecting carbon dioxide for a carbonation reaction, the eluate is aerated with carbon dioxide, or the carbon dioxide is, injected at a pressure of 20 to 30 bar in a high pressure reactor into the paper mill waste sludge.

13. The method of claim 1, further comprising,
    recovering an amine through dialysis, after the carbonation reaction.

* * * * *